United States Patent [19]

Ushiro et al.

[11] Patent Number: 5,023,639
[45] Date of Patent: Jun. 11, 1991

[54] SLAVE ELECTRONIC FLASH UNIT FOR A CAMERA

[75] Inventors: Seimei Ushiro; Hiroshi Ohmura, both of Tokyo, Japan

[73] Assignee: Fuji Photo Film Co., Ltd., Kanagawa, Japan

[21] Appl. No.: 477,521

[22] Filed: Feb. 9, 1990

[30] Foreign Application Priority Data

Feb. 10, 1989 [JP] Japan ................................ 1-32314
Mar. 13, 1989 [JP] Japan ................................ 1-60492

[51] Int. Cl.$^5$ ............................................ G03B 15/03
[52] U.S. Cl. ........................................ 354/132; 362/8; 354/149.1; 354/149.11; 354/424
[58] Field of Search ............... 354/132, 131, 149.1, 354/149.11, 424; 362/3, 8

[56] References Cited

U.S. PATENT DOCUMENTS 4,354,141 10/1982 Takematsu ................. 354/132 X

Primary Examiner—Michael L. Gellner
Assistant Examiner—Howard B. Blankenship
Attorney, Agent, or Firm—Young & Thompson

[57] ABSTRACT

A slave electronic flash unit is removably mounted on a camera having a built-in electronic flash device and generates an auxiliary flash when a part of the flash generated by the built-in electronic flash device is directly detected by a photosensor. A slave electronic flash unit used in combination with a camera of a variable focal length can be flashed only when the camera is set to a telephotography mode in which an exposure is made that would otherwise be under-exposed.

16 Claims, 7 Drawing Sheets

SLAVE ELECTRONIC FLASH UNIT FOR A CAMERA

BACKGROUND OF THE INVENTION

This invention relates to a slave electronic flash unit for a camera and more particularly to a slave electronic flash unit used together with a camera having a built-in electronic flash and adapted to generate an auxiliary flash in order to compensate inadequacy of the light from the built-in electronic flash.

When flash photography is performed using a camera having a built-in electronic flash (hereinafter simply referred to as a "camera"), if the flash from the built-in electronic flash is the only available light, there may be insufficient light when the distance to an object to be photographed is great. In such a case, in addition to having a built-in electronic flash, a conventional electronic flash unit can be employed as an auxiliary light source in order to compensate the insufficient light. In order to employ a conventional electronic flash unit, a hot shoe having a terminal for transmitting a synchronized signal is mounted on the camera, and then the conventional electronic flash unit is mounted on this shoe. However, if a hot shoe is to be mounted on the camera, the number of the component parts and the number of assembly steps are increased, resulting in high cost of the camera. Also, this is not desirable from the viewpoint of providing a compact camera and achieving an aesthetically pleasing design.

Under these above-mentioned circumstances, a camera such as "RICOH FF70D" (brand name, manufactured by Ricoh Co., Ltd., Japan) is known, in which a slave electronic flash unit for generating an auxiliary flash in addition to that of the built-in flash can be utilized as an auxiliary light source. An adapter for the slave electronic flash is provided as an accessory for this camera. This adapter comprises an L-shaped bracket, a photosensor and an accessory shoe mounted on the L-shaped bracket. The adapter is secured to the camera by the tripod mounting screw hole. During flash photography utilizing this slave electronic flash unit, first, the built-in electronic flash device is actuated by a synchronized signal which is in synchronism with the shutter and generates a flash to illuminate the object. Then when a part of the flash reflected by the object and returned is detected by the photosensor, the slave electronic flash unit mounted on the accessory shoe is actuated to direct the auxiliary flash toward the object.

However, in such a slave electronic flash unit, the photosensor of the adapter is disposed in such a manner as to face forward of the camera so that the sensor can receive the reflected light from the object, and as a result it is adversely affected by light from the surroundings. For example, in the event that a plurality of cameras are used as in an indoor photography contest, there is the drawback that the slave electronic flash unit can accidentally flash at an unexpected time because it responds to a flash generated by a built-in type or mounted-type electronic flash device used in adjacent cameras.

OBJECTS OF THE INVENTION

A main object of the present invention is to provide a slave electronic flash unit for a camera which is largely unaffected by light from surroundings and which responds to only the flash of the built-in electronic flash device.

Another object of the invention is to provide a slave electronic flash unit for a camera which can be easily mounted on and removed from said camera without employing a special mounting device.

A further object of the invention is to provide a slave electronic flash unit for a camera which is actuable only when the taking lens of the camera is set to a telephotographic mode for a distant object.

SUMMARY OF THE INVENTION

In order to achieve the above objects, a slave electronic flash unit of the present invention is provided with light path formation means so that part of a flash from a built-in electronic flash device of a camera reaches directly a photosensor.

In a preferred embodiment of the present invention, the unit includes shade means for preventing light reflected from the object from falling on the photosensor, and a collapsible mounting member to mount the slave electronic flash unit on the camera. When the slave electronic flash unit is not used, it can take on a shape convenient to carry and easy to store, by collapsing the mounting member. Furthermore, when the distance to the object is great, the taking lens of the camera is set to a telephotographic mode. The slave electronic flash unit is flashed only when the taking lens is set to this mode. Owing to the foregoing arrangement, flash photography can be performed even in the state wherein the slave electronic flash unit is mounted on the camera, without creating an excessive exposure only by the built-in electronic flash device when the object is near.

BRIEF DESCRIPTION OF THE DRAWINGS

The above and other objects and advantages will become apparent upon reading the detailed description of the invention with reference to the accompanying drawings, wherein.

DETAILED DESCRIPTION OF THE INVENTION

Figure 1:
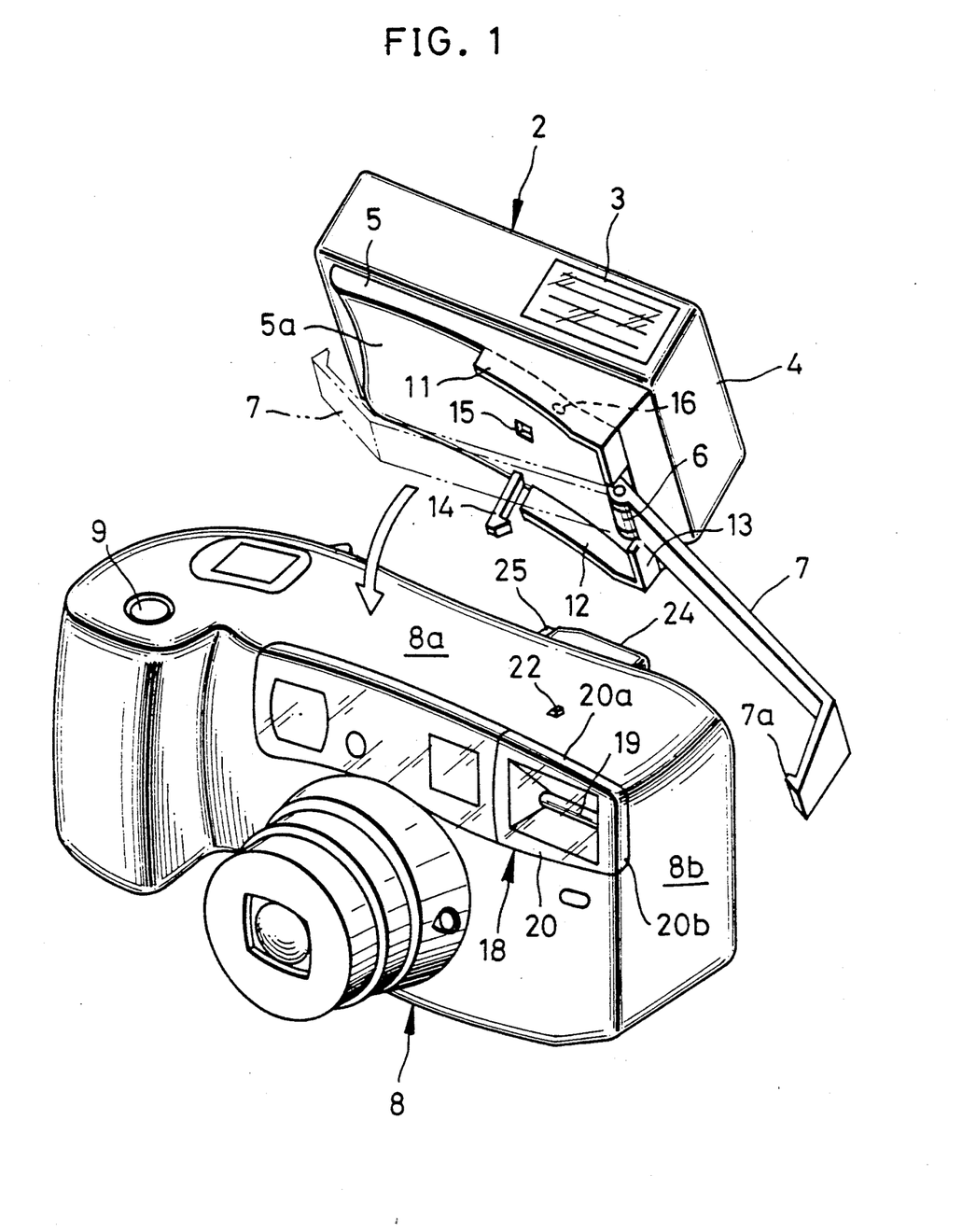
FIG. 1 is a perspective view showing the relation between a slave electronic flash unit of the present invention and a camera.

As is shown in FIG. 1, a slave electronic flash unit 2 used as an auxiliary light source has a housing 4 provided with a flash window 3, a pedestal 5 integrally formed with a bottom surface of the housing 4, and a mounting arm 7 attached to one end of the pedestal 5 by a hinge 6. A bottom surface 5a of the pedestal 5 is formed as a curved surface corresponding to the configuration of an upper surface of the camera 8 on which this slave electronic flash unit 2 is to be mounted. The pedestal 5 is also provided with a front skirt 11, a rear skirt 12, and a side skirt 13 all integrally formed therewith in such a manner as partly to surround the bottom surface 5a of the pedestal 5.

The pedestal 5 is also provided with a hook 14, a recess 15 and an opening 16 formed in the bottom surface 5a thereof. The hook 14 and the recess 15, as will be described in detail hereinafter, are utilized when this slave electronic flash unit 2 is mounted on the camera 8 together with the mounting arm 7 having a claw 7a integrally formed on its tip. Also, a photosensor 17 (see FIG. 4) adapted to detect the flashing of a flash lamp 19 of an electronic flash device built into the camera 8 is disposed within opening 16.

The camera 8 is provided with a flash 18 comprising a built-in electronic flash device at the upper right of the front of the camera. As this built-in electronic flash device is known to those skilled in the art, only its portion having a direct relation to the present invention is shown in the drawing. The flash 18 has a flash lamp 19 and a diffusion plate 20 disposed in front of the flash lamp 19. This diffusion plate 20 forms a window for diffusing and radiating the flash. An upper edge 20a and a right edge 20b of the diffusion plate 20 extend to the upper surface 8a and the right side surface 8b of the camera 8 respectively. The camera 8 is designed to have a plurality of curved surfaces and the upper surface 8a is formed as a curved convex surface. A projection 22 adapted to correctly position the slave electronic flash unit 2 when it is mounted on the camera 8 is integrally formed on the upper surface 8a. Also, the bottom surface of the camera 8 is provided with an engaging hole 23 (see FIG. 2). Furthermore, the rear surface of the camera 8 is provided with an eyepiece 24 of a viewfinder projecting therefrom. The eyepiece 24 is provided with a projection 25 integrally formed with an external wall thereof and adapted to retain the hook 14.

Figure 2:
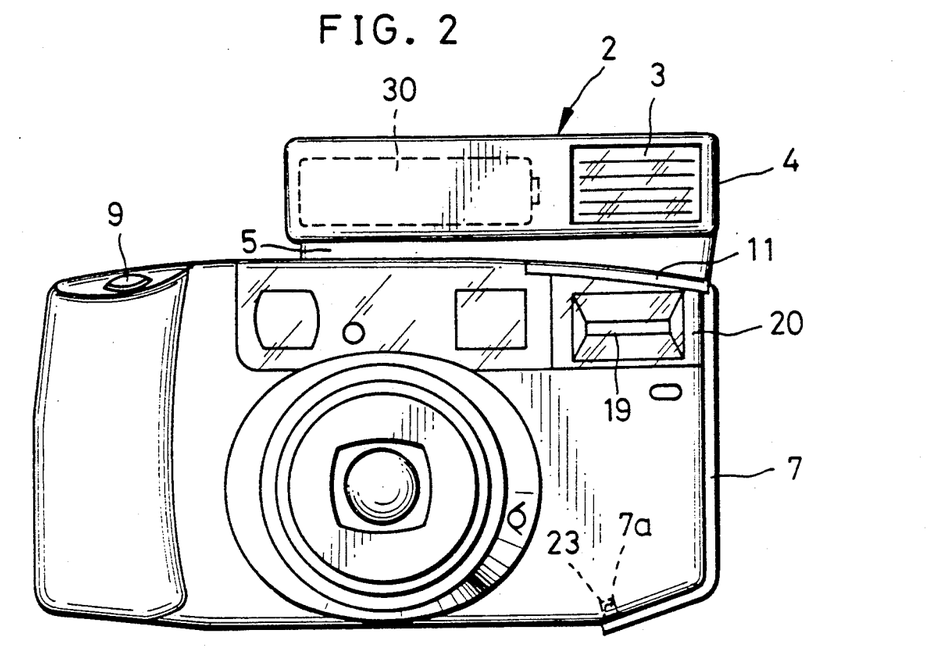
FIG. 2 is a front view showing the slave electronic flash unit of the present invention already mounted on the camera.
Figure 3:
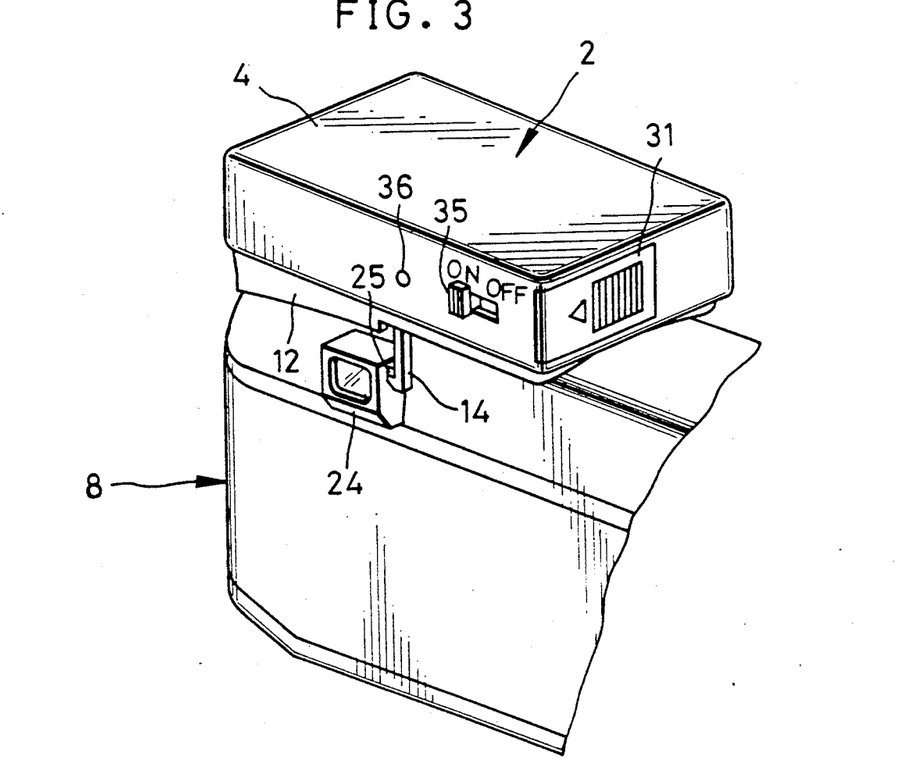
FIG. 3 is a rear perspective view of an important portion of the slave electronic flash unit mounted on the camera.

The slave electronic flash unit 2, as shown in FIGS. 2 and 3, is detachably mounted on the camera 8, which, as previously noted, already has an electronic flash device built therein. When the slave electronic flash unit 2 is applied to the camera 8, the bottom surface 5a of the pedestal is correctly mated with the upper surface 8a of the camera 8. As the front skirt 11, the rear skirt 12 and the side skirt 13 that partly surround this bottom surface 5a are designed such that they cover portions of the front surface, the rear surface and the side surface of the camera 8 from the above respectively, the positioning of the slave electronic flash unit 2 is easy. In the correctly mounted position, the projection 22 is engaged in the recess 15 and the hook 14 is engaged with the projection 25 on the eyepiece 24.

The arm 7 is then swung down against the right side surface 8b of the camera 8 with the slave electronic flash unit 2 thus correctly positioned. The claw 7a formed on the tip of the arm 7 enters the engaging hole 23 formed in the bottom surface of the camera 8. As a result, the slave electronic flash unit 2, as shown in FIG. 2, is firmly mounted on the upper surface 8a of the camera 8 and the mounting arm 7 is also in contact with the right side surface 8b of the camera 8 under pressure, thus providing an unbroken outer appearance. The front skirt 11 and the rear skirt 12 partly cover the front surface and the rear surface of the camera 8 from above, respectively. Particularly, the front skirt 11 encloses therein the upper edge 20a of the diffusion plate 20 of the built-in electronic flash device. Thanks to this arrangement, the slave electronic flash unit 2 can be easily mounted on and removed from the camera 8 merely by swinging the mounting arm 7 and without using a tripod screw or the like. And if the mounting arm 7 is collapsed as shown by the dotted chain lines of FIG. 1 when the slave electronic flash unit 2 is not used, it will be compact and easy to carry in a pocket, etc.

As one example, a sum-3 cell 30 is used as a power source for the slave electronic flash unit 2. The sum-3 cell 30 can be loaded in the housing 4 by opening a cell cover 31 (see FIG. 3). The loaded cell 30, as shown in FIG. 2, is located to the left of the flash window 3 and occupies a generally central position on the camera 8 when mounted thereon. Therefore, even when the slave electronic flash unit 2 is mounted on the camera, the weight of the camera will be nicely balanced.

Figure 5:
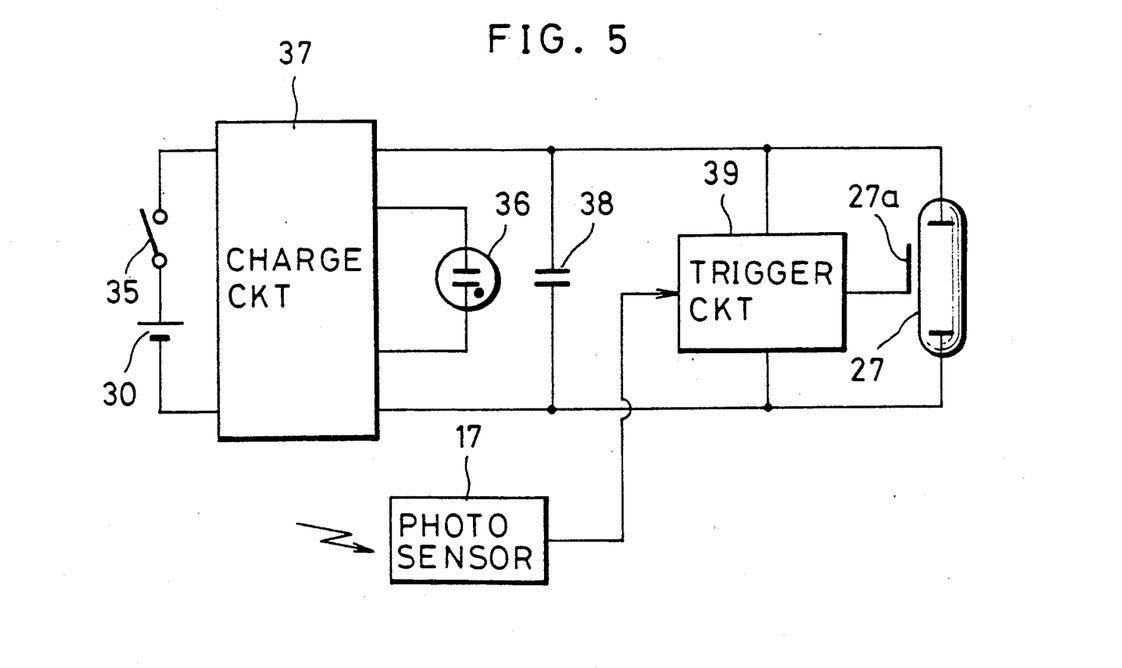
FIG. 5 is an electric circuit diagram of the slave electronic flash unit.

The electrical circuit of the slave electronic flash unit 2 is shown in FIG. 5. When the power switch 35 is turned on, the cell 30 is placed in circuit with a charge circuit 37. A main condenser 38 is charged to a predetermined voltage, e.g., 300 V, by this charge circuit 37. When the charging operation of this main condenser 38 is finished, a neon tube 36 flashes. Upon detection of this flashing light, the photosensor 17 transmits a detecting signal to a trigger circuit 39 in order to actuate the trigger circuit 39 to supply high voltage to a trigger electrode 27a of the flash lamp 27. When the flash lamp 27 is triggered, the flash lamp 27 generates an auxiliary or additional flash using the electrical energy of the main condenser 38.

Next, flashing of the slave electronic flash unit 2 mounted on the camera 8 will be described. When photographing an object at a great distance, illumination by the built-in flash is insufficient and an under-exposure results. For such photography, therefore, the power switch 35 will be set to the ON position and the slave electronic flash unit will be used. When the power switch 35 is turned on, the charge circuit 37 is actuated to start charging the main condenser 38. When the charging operation of the main condenser 38 is finished, the neon tube 36 flashes. After this, flash photography using the slave electronic flash unit 2 becomes possible. When the release button 9 of the camera 8 is pushed, the shutter is opened and closed in the manner as known per se and the object is recorded on the film. The synchronized switch is turned on in such a manner as to be interlocked with the action of the shutter. In accordance with the synchronized signal generated by the foregoing operation, the flash lamp 19 is triggered and instantaneously flashes.

Figure 4:
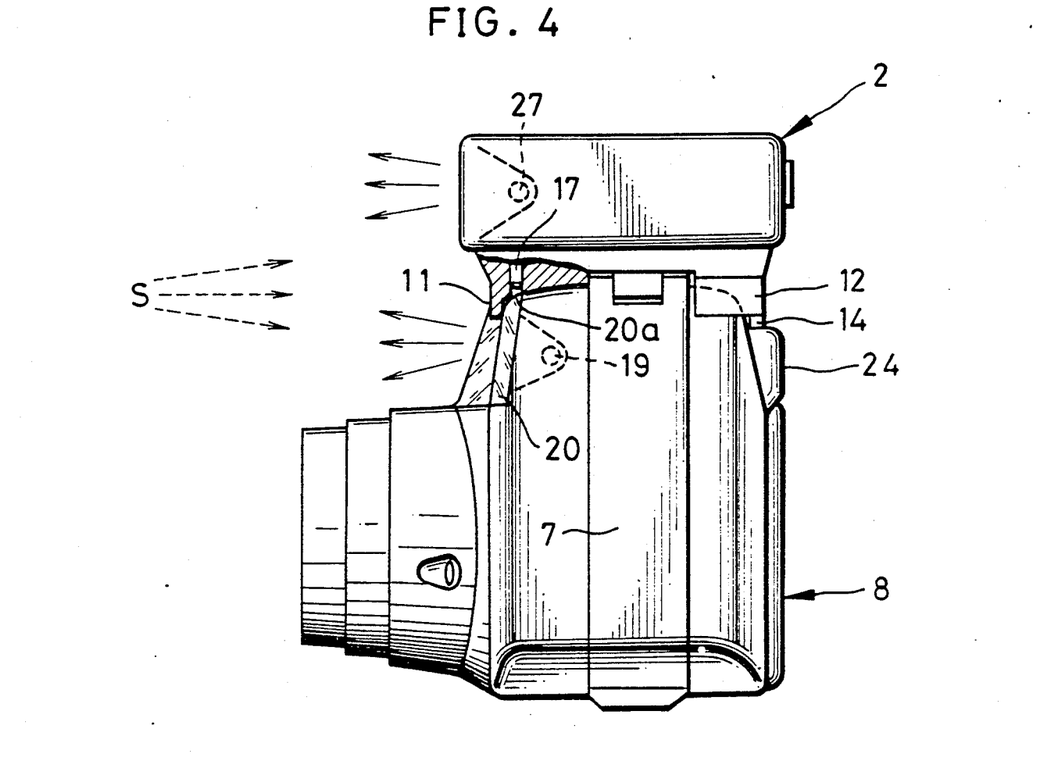
FIG. 4 is a partly cutaway side view showing the slave electronic flash unit mounted on the camera.

Most of the light from the flash lamp 19 is radiated toward the object from the front surface of the diffusion plate 20. A part of th light, however, is also radiated from the upper edge 20a and right edge 20b of the diffusion plate 20. As the opening 16 formed in the bottom surface 5a of the pedestal 5 faces the upper edge 20a of the diffusion plate 20 as shown in FIG. 4, the flash light radiated from the upper edge 20a is directly detected by the photosensor 17. When the photosensor 17 has detected the flash of the built-in electronic flash device, the trigger circuit 39 built in the housing 4 generates a trigger signal. According to this trigger signal, the flash lamp 27 of the flash 3 is instantaneously flashed by the electrical energy of the main condenser 38 and radiates a flash of auxiliary light toward the object. As a result, the built-in electronic flash device and the slave electronic flash unit 2 are flashed in this order, and sufficient light for taking a picture with a proper exposure is shed on the object by these two members.

As is shown in FIG. 4, as the front skirt 11 covers the diffusion plate 20 in such a manner as to enclose the upper edge 20a thereof, even if flash photography is being performed by other cameras, the reflected light S from the object does not reach the photosensor 17. Similarly, even if flash photography is being performed from the rear by other cameras, as the rear skirt 12 blocks such light, the slave electronic flash unit 2 is masked from this light and is not flashed.

It is possible to design the device such that the slave electronic flash unit 2 is mounted on the camera 8 in such a manner as to lie along the right side surface 8b thereof so that the flash coming from the right edge 20b of the diffusion plate 20 can be detected by the photosensor 17. Alternatively, it may be designed such that a part of the flash radiated from the front surface of the diffusion plate 12 is withdrawn by, for example, a light guide or the like and then guided to the photosensor 17 built into the slave electronic flash unit 2.

Figure 6:
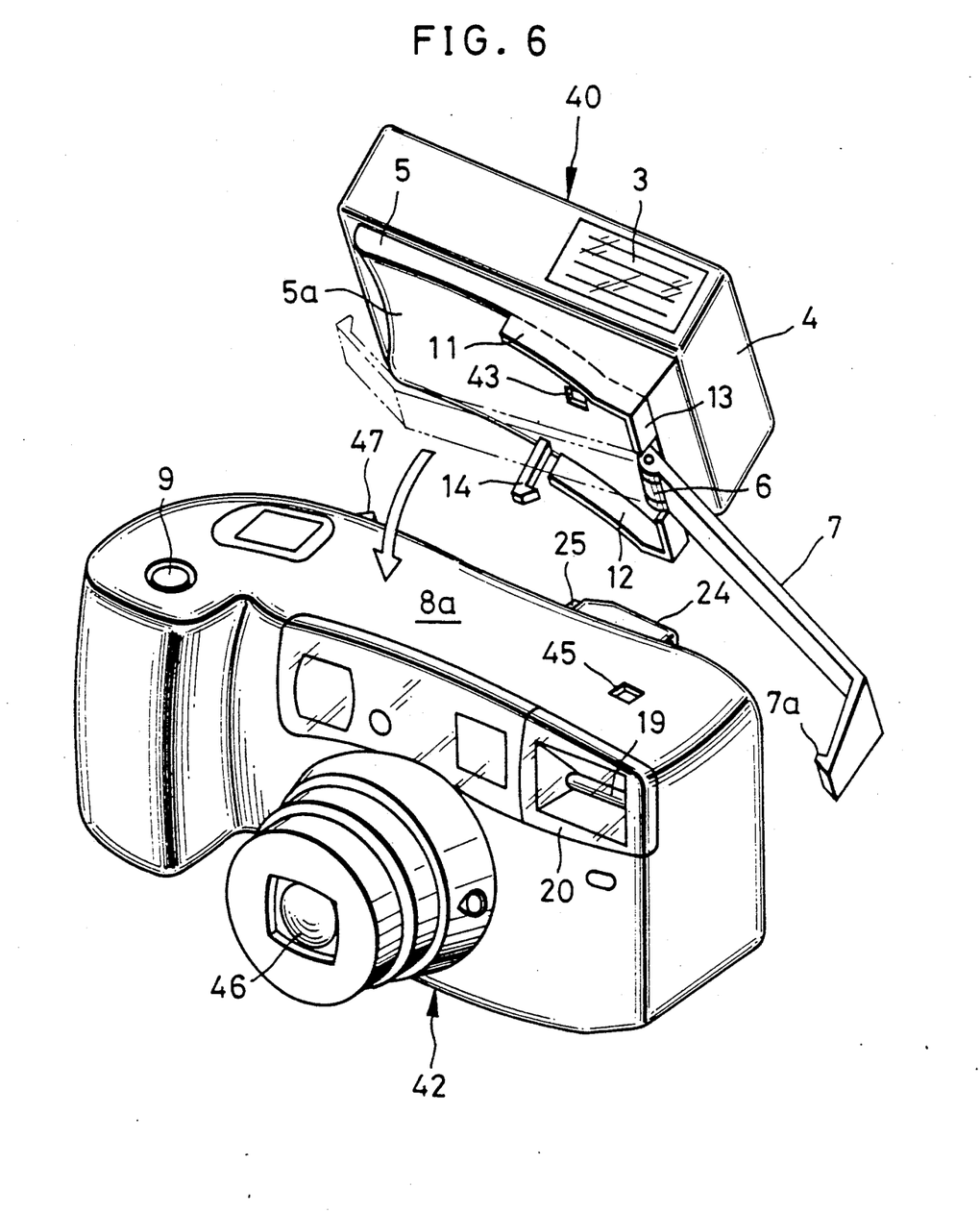
FIG. 6 is a perspective view showing the relation between a slave electronic flash unit according to a second embodiment of the present invention and a camera.
Figure 7:
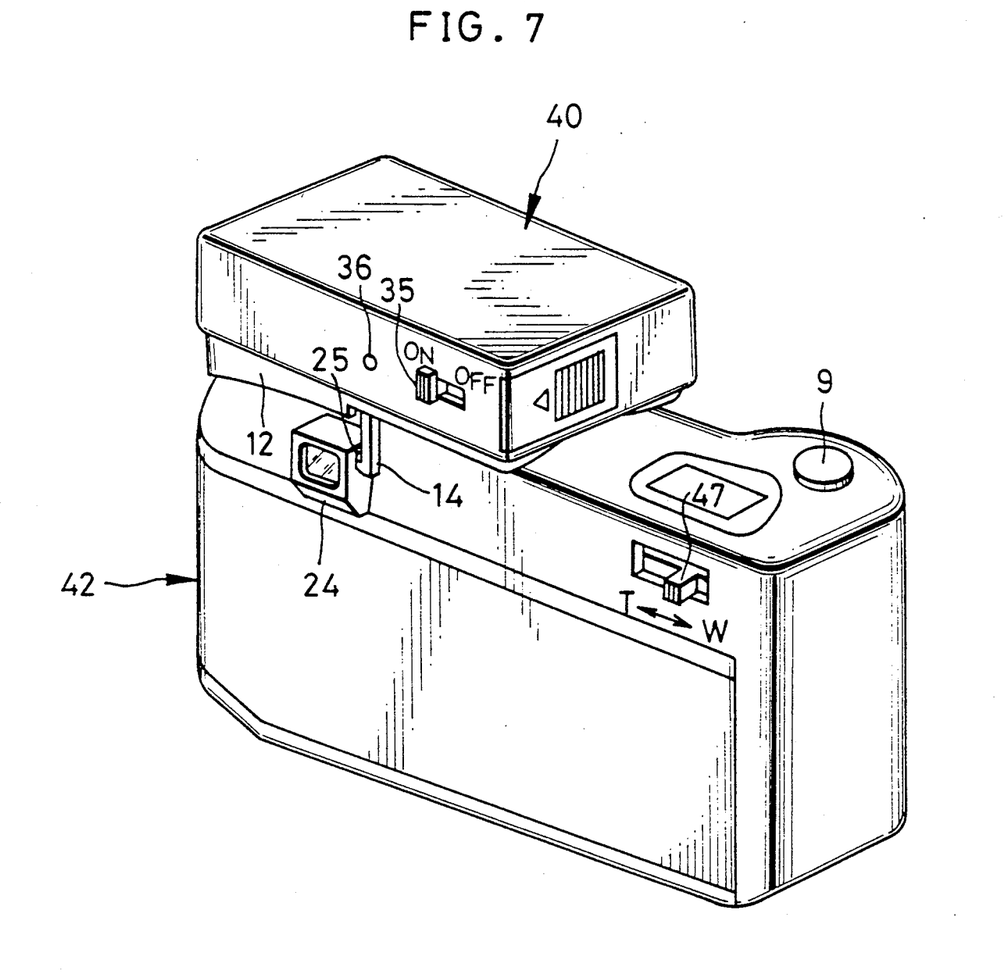
FIG. 7 is a rear perspective view of the slave electronic flash unit already mounted on the camera.

FIG. 6 shows a slave electronic flash unit 40 according to a second embodiment of the present invention and a camera 42 used therewith. Substantially the same component parts as those of the first embodiment are denoted by the same reference numerals. A slave electronic flash unit 40 has an opening 43 for receiving light which is formed in a position nearer to the back surface than the opening 16 of the first embodiment. Therefore, when the flash lamp 19 is fired, the light from one end face of the diffusion plate 20 is not incident to the opening 43.

The camera 42 has an opening 45 formed in an upper surface thereof such that when the slave electronic flash unit 40 is mounted on the camera 42, this opening 45 overlaps the opening 43 of the slave electronic flash unit 40. As will be described in detail hereinafter, only when flash photography is performed with taking lens 46 of the camera 42 set to the telephotography mode, will a part of the light from the flash lamp 29 be emitted from the opening 45 into the slave electronic flash unit 40 via the opening 43.

This camera 42 can be used both for wide angle photography and for telephotography. For this purpose, a switch knob 47 is provided on the back of the camera 42. When the switch knob 47 is set to a mark "W", the taking lens 46 is retracted to a wide angle photography position by movement in parallel with the optical axis. When the switch knob 47 is set to a mark "T", the taking lens 46 is advanced to a telephotography position by movement in parallel with the optical axis.

Figure 8A:
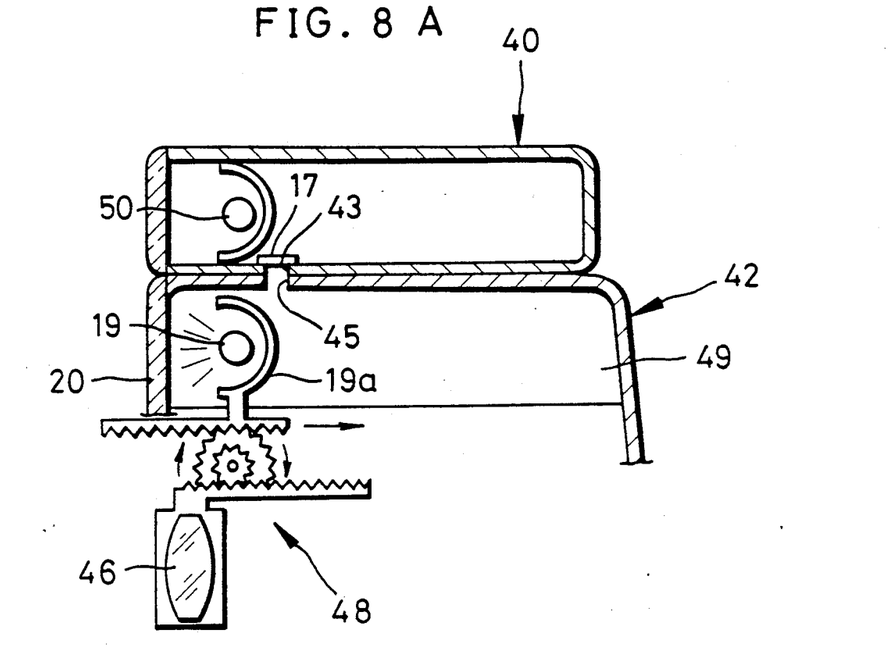
FIGS. 8A and 8B are schematic views explaining the operation of the second embodiment of the present invention.
Figure 8B:
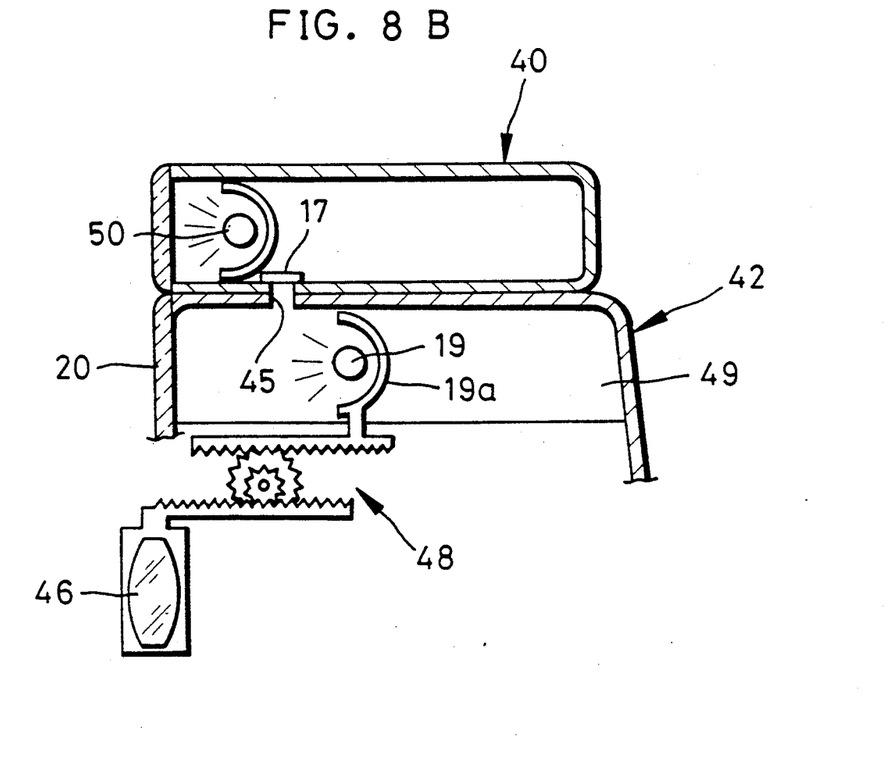

The flash lamp 19 and a reflector 19a disposed behind the flash lamp 19 are movable between an advanced position near the diffusion plate 20 shown in FIG. 8A and a retracted position away from the diffusion plate 20 shown in FIG. 8B. When the taking lens 46 is brought to the wide angle photography position by operating the switch knob 47, the flash lamp 19 and the reflector 19a are moved to the advanced position by an interlocked mechanism 48 comprising a rack and a pinion. When the flash lamp 19 is fired in this position, light is radiated over a wide angle through the diffusion plate 20. Therefore, there is obtained a light distribution suitable for wide angle photography. As the reflector 19a reflects the light from the flash lamp 19 forwardly, the light is not emitted through the opening 45 when the reflector 19a is in a position forward of the opening 45 even when the flash lamp 19 is fired.

On the other hand, when the taking lens 46 is moved to the telephotography position by operating the switch knob 47, the flash lamp 19 and the reflector 19a are moved to the retracted position shown in FIG. 8B by the interlocked mechanism 48 comprising the rack and the pinion. In this state, the radiating angle of the flash lamp through the diffusion plate 20 is narrow and thus there is obtained a light distribution favorable to telephotography. Furthermore, as the reflector 19a is retracted behind the opening 45, a part of the light, when the flash lamp 19 is fired, is reflected within a chamber 49 and passes through the opening 45 and through the opening 28 of the slave electronic flash unit 40 and is received by the photosensor 17. Alternatively, in order to change the distribution of the light between wide angle photography and telephotography, the flash lamp 19 and the reflector 19a can be fixed, and the diffusion plate 20 can be moved forward and backward.

According to the embodiment of FIGS. 8A and 8B, the flash lamp 19 and the reflector 19a are in the advanced position when the taking lens is set to the wide angle photography mode. Therefore, even if flash photography is performed by the camera 42 with the slave electronic flash unit 40 mounted thereon, the light from the flash lamp 19 does not fall on the photosensor 17, and flash photography is performed using only the light of the flash lamp 19 built into the camera 42. As a result, when wide angle photography is performed in which a near object is photographed, the object is not excessively exposed because the slave electronic flash unit 40 is not fired.

On the other hand, when the taking lens is set to the telephotography mode, the flash lamp 19 and the reflector 19a built into the camera 42 are in the retracted position. Therefore, when flash photography is performed in this state, a part of the light from the flash lamp 19 reaches the photosensor 17 through the openings 45 and 43, and in response to this, a flash lamp 50 of the slave electronic flash unit 40 is slave fired. As telephotography is often performed when the object is at a great distance, a sufficient illumination is given to the object by performing flash photography in which the slave electronic flash unit 40 is jointly used.

When the taking lens is set to the telephotographic mode, if flash photography is performed by other cameras, a part of the light reflected from the object enters the chamber 49 through the diffusion plate 20. However, as its brightness is very low, the slave electronic flash unit 40 is not fired.

Figure 9:
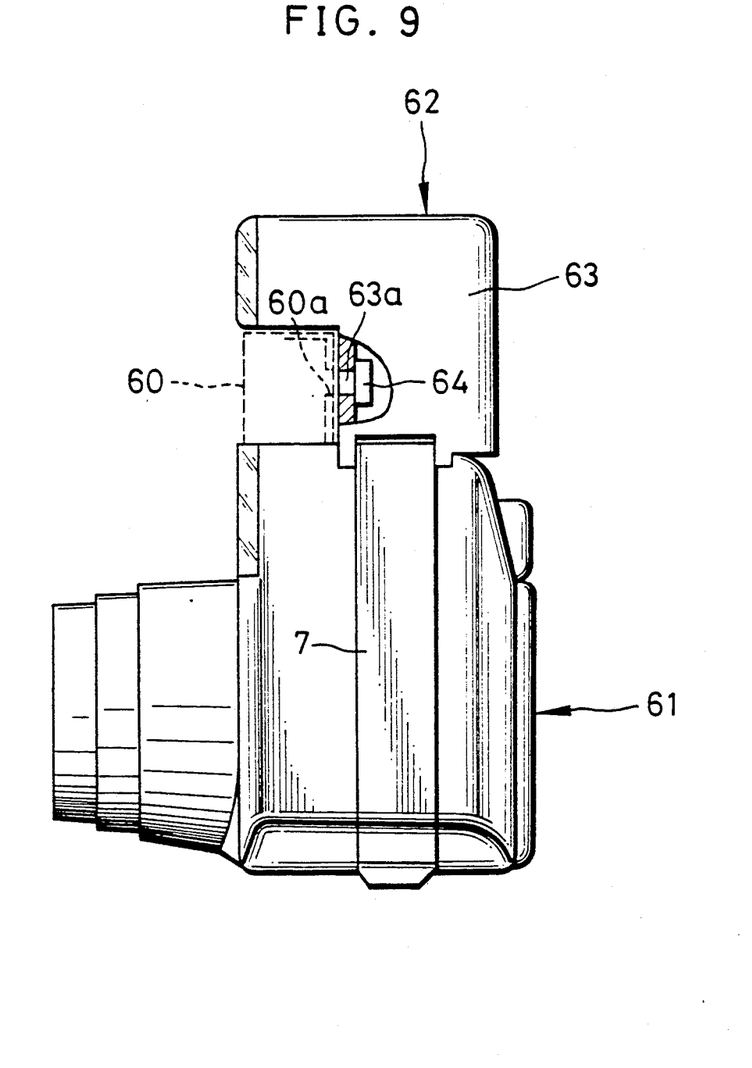
FIG. 9 is a side view showing a slave electronic flash unit according to a third embodiment of the present invention and a camera on which it is mounted.

FIG. 9 shows another embodiment in which the present invention is applied to a camera 61 of the type in which a flashing portion 60 of the built-in electronic flash device pops up when flash telephotography is performed. A housing 63 of a slave electronic flash unit 62 has a side surface which is formed in a generally L-shape, and a photosensor 64 is disposed behind an opening 63a formed in a front surface of the housing 63. When the flashing portion 60 of the built-in electronic flash device pops up as shown by the dotted line in order to perform flash telephotography, an opening 60a formed in the rear surface of the flashing portion 60 faces the opening 63a of the housing 63. A part of the light coming from the flashing portion 60 falls on the photosensor 64 through these openings 60a and 63a. In order to distinguish between light from the flashing portion 60 and light from other sources, a comparator is employed so that the comparator outputs a detecting signal only when light whose intensity is above a predetermined level is received, whereupon the slave electronic flash unit 62 is fired.

For wide angle flash photography, the flashing portion 60 is lowered. In this case, the camera resembles that shown in FIG. 1. As no obstacle is present in front of the opening 63a, the light reflected by and returned from the object falls on the photosensor 64 through the opening 63a. However, as its brightness is not great, no detecting signal is generated. Therefore, the slave electronic flash unit 62 is not fired.

In the FIG. 9 embodiment, the wide angle photography mode is distinguished from the telephotography mode by an interlock with the built-in electronic flash device. Alternatively, the camera may be designed such that the two modes are distinguished by the set position of the taking lens, and the slave electronic flash unit is fired only when the taking lens is in the telephotography mode.

Furthermore, the present invention can be applied not only to a variable focus camera which can selectively perform wide angle photography or telephotography but also to a camera equipped with a zoom lens. For example, if the focal length of the zoom lens is variable within a range from 35 mm to 105 mm, the light path formation means may be such that the light from the built-in electronic flash device enters the photosensor of the slave electronic flash unit when the focal length becomes 80 mm or more, that is to say when the focal length reaches the telephotographic range.

Furthermore, the present invention may include a shutter for opening and closing the opening formed in front of the photosensor so that a shutter plate is retracted from the opening when the taking lens is in the telephotography mode. Moreover, in the embodiment wherein the auxiliary flash is fired only when the taking lens is in the telephotography mode, the invention may include a hot shoe having a synchronized terminal mounted thereon which is mounted on the camera and the conventional electronic flash unit without the photosensor being mounted thereon. In this case, a switch which is turned on by being interlocked with the taking lens or the built-in electronic flash device is connected between the synchronized switch interlocked with the shutter and the synchronized terminal. By virtue of the foregoing arrangement, the synchronized signal is transmitted both to the built-in electronic flash device and to the conventional electronic flash unit only when the taking lens is in the flash telephotography mode. Therefore, both the flashes are fired simultaneously.

Although several embodiments have been described in the foregoing, the present invention is not limited to these embodiments. It will be appreciated that various changes and modifications can be made without departing from the spirit of the invention.

What is claimed is:

1. For use with a camera provided with an electronic flash device built therein, a slave electronic flash unit adapted to be mounted on a said camera and having a flash emission window for permitting a flash to be transmitted therethrough, said slave unit comprising:
   flash emission means for emitting an auxiliary flash;
   a housing containing therein said flash emission means and having a hole through a bottom surface thereof;
   a photosensor adapted to output a detecting signal when said sensor directly detects a flash from said built-in electronic flash device through said hole; and
   means for flashing said flash emission means when said detecting signal is generated.

2. A slave electronic flash unit as claimed in claim 1, further comprising shade means for preventing light from an object illuminated by said flash emission means from falling on said photosensor.

3. A slave electronic flash unit as claimed in claim 2, wherein said shade means is a skirt portion projecting downward along an outer periphery of a bottom surface of said housing, said skirt portion being adapted to fit to upper end portions of a front surface and a side surface and a rear surface of a said camera.

4. A slave electronic flash unit as claimed in claim 1, which has first and second mounting members engageable with engaging portions formed at at least two spaced locations on an outer surface of a said camera and adapted to secure said housing to said camera.

5. A slave electronic flash unit as claimed in claim 4, wherein said first mounting member is a hook to be engaged with a side surface of an eyepiece of a said camera and said second mounting member is formed in a generally L-shape and includes a first arm portion adapted to abut against a side surface of a said camera, a second arm portion adapted to abut against a bottom surface of a said camera, and a claw disposed on a tip of said second arm portion and adapted to engage with a bottom surface of a said camera.

6. A slave electronic flash unit as claimed in claim 5, wherein said second mounting member is mounted on said housing by a hinge so that said second mounting member can be collapsed when said unit is stored.

7. A combination of a camera having a built-in electronic flash device for generating a flash and a taking lens of variable focal length, means to advance said taking lens to a telephotography position and to retract said lens to a wide angle photography position, and a slave electronic flash unit mounted on said camera and adapted to generate an auxiliary flash;
   light path formation means for directly introducing light from said built-in electronic flash device into said slave electronic flash unit only when said taking lens is advanced to said telephotography position;
   a photosensor for generating a detecting signal when it detects said light; and
   means responsive to said detecting signal to flash said slave electronic flash unit.

8. The combination as claimed in claim 7, wherein said light path formation means comprises:
   first and second openings formed in said built-in electronic flash device and said slave electronic flash unit respectively, said first and second openings registering with each other when said slave electronic flash unit is mounted on said camera; and
   means permitting said light from said built-in electronic flash device to be projected through said registering openings only when said taking lens is advanced to said telephotography mode.

9. The combination as claimed in claim 8, wherein said built-in electronic flash device has a flash lamp for generating said flash, a diffusion plate for diffusing said flash, and means for changing the distance between said diffusion plate and said flash lamp upon movement of said taking lens between said positions, said first opening being located between said flash lamp and said diffusion plate when said taking lens is advanced to said telephotography position.

10. The combination as claimed in claim 9, wherein said distance changing means moves said flash lamp.

11. The combination as claimed in claim 9, wherein said taking lens is a zoom lens.

12. The combination as claimed in claim 7, wherein said built-in electronic flash device is within said camera when said taking lens is in said wide angle photography position and in a popped-up position when said taking lens is in said telephotography position, said light path formation means comprising a first hole formed in a rear surface of said built-in electronic flash device and adapted to emit light, and a second opening formed in a front surface of said slave electronic flash unit that registers with said first hole in said popped-up position of said built-in electronic flash device so that said light from said built-in electronic flash directly falls on said photosensor.

13. A combination of a camera having a built-in electronic flash device for generating a flash and a taking lens of variable focal length, means to advance said taking lens to a telephotography position and to retract said lens to a wide angle photography position, a slave electronic flash unit mounted on said camera and adapted to generate an auxiliary flash, and means for flashing said electronic flash unit simultaneously with said built-in electronic flash device only when said taking lens is in said telephotography position.

14. For use with a camera provided with an electronic flash device built therein, a slave electronic flash unit adapted to be mounted on a said camera and having a flash emission window for permitting a flash to be transmitted therethrough, said slave unit comprising:

flash emission means for emitting an auxiliary flash;
a housing containing therein said flash emission means;
a photosensor adapted to output a detecting signal when said sensor directly detects a flash from said built-in electronic flash device;
means for flashing said flash emission means when said detecting signal is generated; and
shade means for preventing light from an object illuminated by said flash emission means from falling on said photosensor, said shade means comprising a skirt portion projecting downward along an outer periphery of a bottom surface of said housing, said skirt portion being adapted to fit to upper end portions of a front surface and a side surface and a rear surface of said camera.

15. For use with a camera provided with an electronic flash device built therein, a slave electronic flash unit adapted to be mounted on a said camera and having a flash emission window for permitting a flash to be transmitted therethrough, said slave unit comprising:

flash emission means for emitting an auxiliary flash;
a housing containing therein said flash emission means;
a photosensor adapted to output a detecting signal when said sensor directly detects a flash from said built-in electronic flash device;
means for flashing said flash emission means when said detecting signal is generated; and
first and second mounting members engageable with engaging portions formed at at least two spaced locations on an outer surface of a said camera and adapted to secure said housing to a said camera,
said first mounting member comprising a hook to be engaged with a side surface of an eyepiece of a said camera and said second mounting member being generally L-shaped and including a first arm portion adapted to abut against a side surface of a said camera, a second arm portion adapted to abut against a bottom surface of a said camera, and a claw disposed on a tip of said second arm portion and adapted to engage with a bottom surface of a said camera.

16. A slave electronic flash unit as claimed in claim 15, wherein said second mounting member is mounted on said housing by a hinge so that said second mounting member can be collapsed when said unit is stored.

* * * * *